(12) United States Patent
Zou

(10) Patent No.: US 7,299,523 B2
(45) Date of Patent: Nov. 27, 2007

(54) HINGE MECHANISM FOR FOLDABLE ELECTRONIC DEVICE

(75) Inventor: Zhi-Gang Zou, Fullerton, CA (US)

(73) Assignees: Shenzhen Futaihong Precision Industrial Co., Ltd., Shenzhen, Guangdon Province (CN); Sutech Trading Limited, Tortola (VG)

( * ) Notice: Subject to any disclaimer, the term of this patent is extended or adjusted under 35 U.S.C. 154(b) by 175 days.

(21) Appl. No.: 11/111,110

(22) Filed: Apr. 21, 2005

(65) Prior Publication Data

US 2005/0235458 A1    Oct. 27, 2005

(30) Foreign Application Priority Data

Apr. 27, 2004  (TW) .............................. 93206452 U

(51) Int. Cl.
*F05F 1/08* (2006.01)
(52) U.S. Cl. .............................. 16/287; 16/277; 16/366
(58) Field of Classification Search .................. 16/287, 16/302, 250, 255, 271, 277, 280, 282, 291, 16/307, 345, 348, 366; 455/90, 556, 550, 455/575; 361/381, 683, 803; 379/433.13, 379/433, 428; 403/119, 120
See application file for complete search history.

(56) References Cited

U.S. PATENT DOCUMENTS

| | | | | |
|---|---|---|---|---|
| 2,558,228 A | * | 6/1951 | Young | |
| 2,645,810 A | * | 7/1953 | Galla | |
| 3,344,462 A | * | 10/1967 | Webster | |
| 3,514,893 A | * | 6/1970 | Paksy | |
| 3,518,715 A | * | 7/1970 | Weiner | ........................... 16/80 |
| 3,643,291 A | * | 2/1972 | Clark | |
| 4,131,378 A | * | 12/1978 | Daws | |
| 5,481,430 A | * | 1/1996 | Miyagawa et al. | |
| 5,991,150 A | * | 11/1999 | Chiu et al. | |
| 6,009,568 A | * | 1/2000 | Miyazaki | |
| 6,154,359 A | * | 11/2000 | Kamikakai et al. | |
| 6,530,122 B1 | * | 3/2003 | Kondou et al. | ................ 16/335 |
| 6,574,835 B2 | * | 6/2003 | Melhuish | ...................... 16/282 |
| 6,804,858 B2 | * | 10/2004 | Yazawa et al. | ................ 16/289 |
| 6,842,627 B2 | * | 1/2005 | Harsu et al. | ............. 455/550.1 |

(Continued)

FOREIGN PATENT DOCUMENTS

CN         1089844 C         8/2002

(Continued)

*Primary Examiner*—William L. Miller
(74) *Attorney, Agent, or Firm*—Morris Manning Martin LLP; Tim Tingkang Xia, Esq.

(57) ABSTRACT

A hinge mechanism for joining a cover (5) to a main housing (4) of a foldable radiotelephone includes a rotation assembly (1). The rotation assembly includes a hollow connecting member formed by two casings (13) each having two slots (131), two shafts (12), and an elastic member (11) with two end hooks (111), the elastic member being received in the connecting member. The shafts are received through the hooks and through holes cooperatively formed by the slots, and are engaged in the cover and the main housing. The rotation assembly thus pivotably connects the cover to the main housing. The shafts are slidable along the holes. When the cover is manually opened, the shafts slide and stretch the elastic member. When the cover reaches a predetermined angle, the elastic member rebounds and drives the shafts to slide in opposite directions, whereby the cover is automatically further opened.

16 Claims, 6 Drawing Sheets

U.S. PATENT DOCUMENTS 6,895,638 B2 * 5/2005 Lin .......................... 16/368
2004/0212956 A1 * 10/2004 Kuivas et al.
2005/0122671 A1 * 6/2005 Homer
2005/0155182 A1 * 7/2005 Han et al.

FOREIGN PATENT DOCUMENTS

JP        407076966 A  *  3/1995

* cited by examiner

HINGE MECHANISM FOR FOLDABLE ELECTRONIC DEVICE

BACKGROUND OF THE INVENTION

1. Field of the Invention

The present invention generally relates to hinge mechanisms, and more particularly to a hinge mechanism for hinging together the housings of a foldable, portable electronic device such as a foldable radiotelephone.

2. Related Art

Portable radiotelephones generally have two housings joined by a type of hinge that allows the housings to fold upon one another. Many such foldable radiotelephones have most of the electronics in one housing, called the main housing, and fewer electronics in the other housing, called the cover. Other such foldable radiotelephones have all the electronics in the main housing, with the cover serving only to cover a keypad and a display of the main housing. The main housing and the cover are connected together by a hinge mechanism. The opening or closing of most covers is achieved by means of cams of the hinge mechanism.

One such kind of hinge mechanism is disclosed in China Pat. No. 98109390.6 issued to Kato Electric & Machinery Company. The hinge mechanism comprises a shaft with a flange, a spring, a cam with a hole therethrough, and a sliding cam with a hole therethrough. The cam is fixed to the shaft, while the sliding cam is rotatably assembled on the shaft opposite to the cam. The cam and the sliding cam can slide on the shaft. The spring surrounds the shaft. The sliding cam is fixed to the cover of a portable radiotelephone, while the cam is fixed to the main housing of the portable radiotelephone. When the cover is manually opened, the sliding cam rotates together with the cover. Simultaneously, the spring is pressed as a convexity of the sliding cam rides along a convexity of the cam. Once the cover is opened to a given angle, the cover can continue to open automatically by action of the spring and the convexities. The process of closing the cover is substantially the reverse of the above-described opening process.

However, the convexities are difficult to manufacture. In addition, extra space in the housing and the cover is required for the hinge mechanism. This makes manufacturing of the housing and the cover difficult.

What is need, therefore, is a hinge mechanism which is relatively simple and easy to manufacture.

SUMMARY

In preferred embodiments herein, a hinge mechanism is provided for pivotably joining a cover to a main housing of a foldable radiotelephone. The hinge mechanism comprises a rotation assembly comprising a hollow connecting member, two shafts adapted to pivotably connect opposite ends of the connecting member with the cover and the main housing, and an elastic member received in the connecting member. Two opposite ends of the elastic member are engaged with the shafts respectively. At least one of the shafts is slidable along a longitudinal axis of the connecting member. When the cover is manually opened relative to the main housing, the at least one shaft slides along the longitudinal axis in a first direction and stretches the elastic member. When the cover reaches a predetermined angle relative to the main housing, the elastic member rebounds and drives the at least one shaft to slide along the longitudinal axis in a second direction opposite to the first direction, whereby the cover is automatically further opened relative to the main housing.

In preferred embodiments herein, a foldable electronic device is provided. The hinge mechanism comprises a main housing having a first socket in one end thereof, a cover having a second socket in one end thereof corresponding to the first socket, and the above-described connecting member of the hinge mechanism received in the first and second sockets and thereby interconnecting the cover and the main housing.

Other advantages and novel features of the embodiments of the present invention will become more apparent from the following detailed description of preferred embodiments thereof when taken in conjunction with the accompanying drawings, in which:

DETAILED DESCRIPTION OF PREFERRED EMBODIMENT

Figure 1:
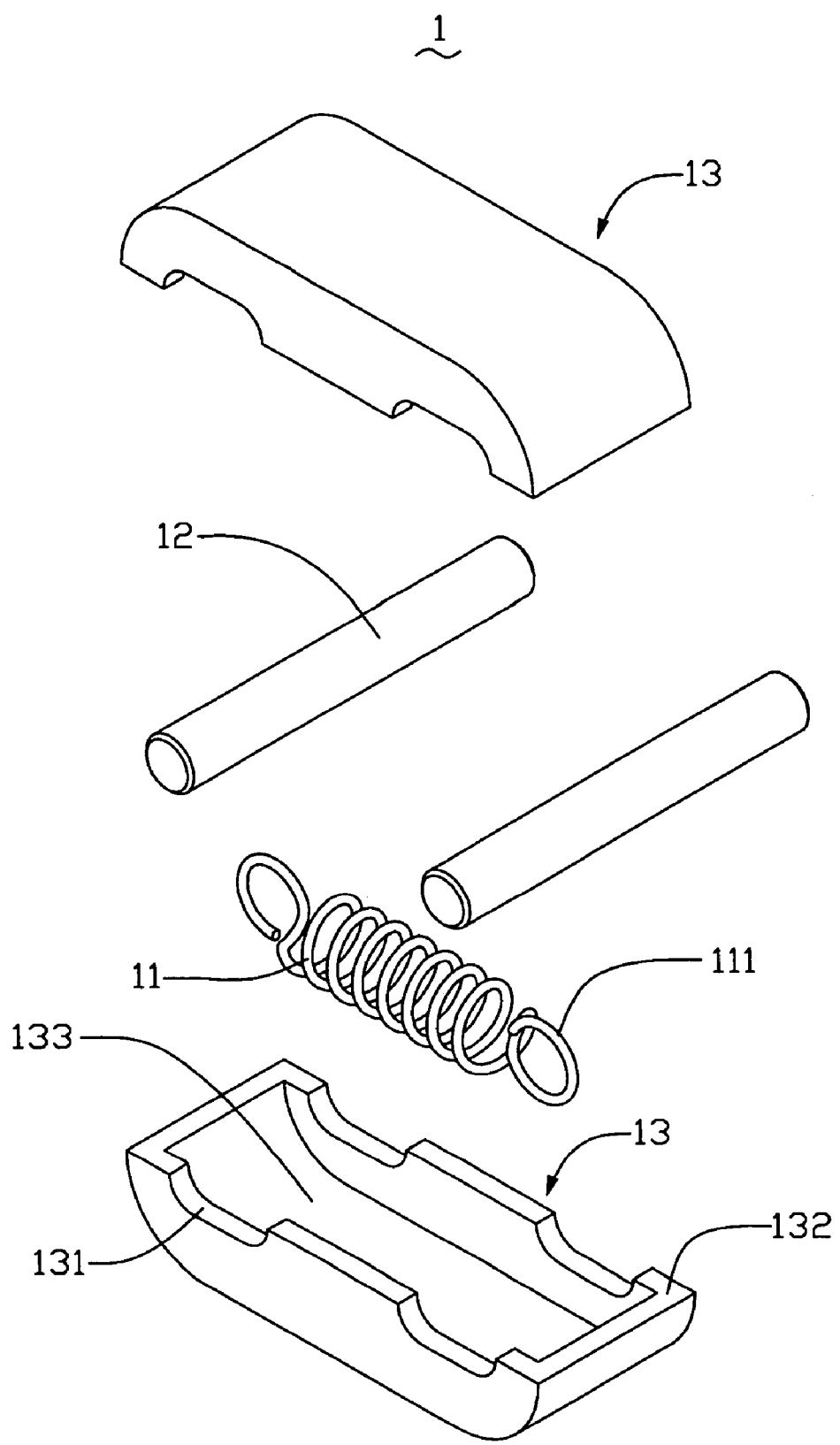
FIG. 1 is an exploded, isometric view of a rotation assembly of a hinge mechanism in accordance with a preferred embodiment of the present invention.
Figure 2:
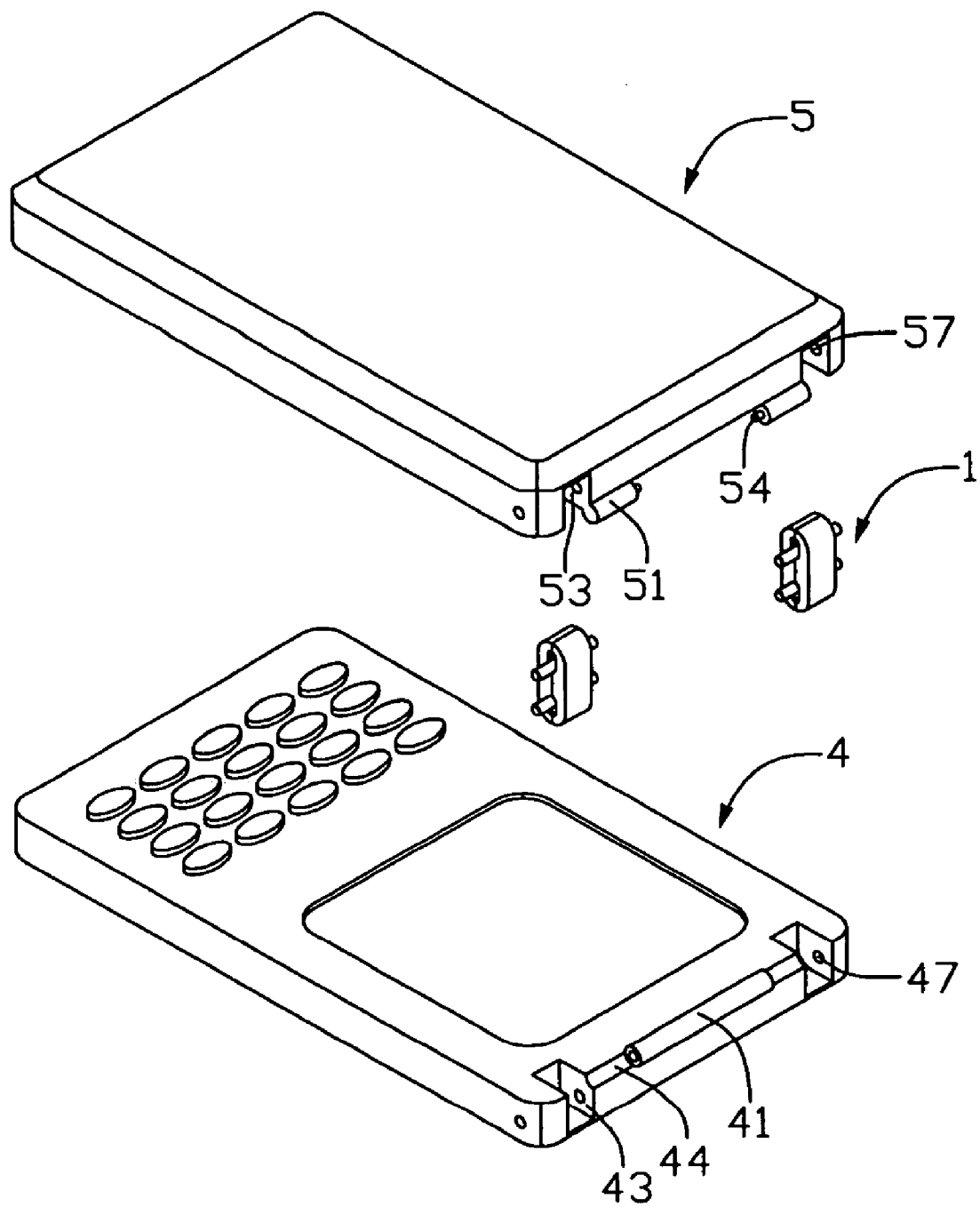
FIG. 2 is an exploded, isometric view of a foldable radiotelephone including the hinge mechanism of the preferred embodiment of the present invention.
Figure 3:
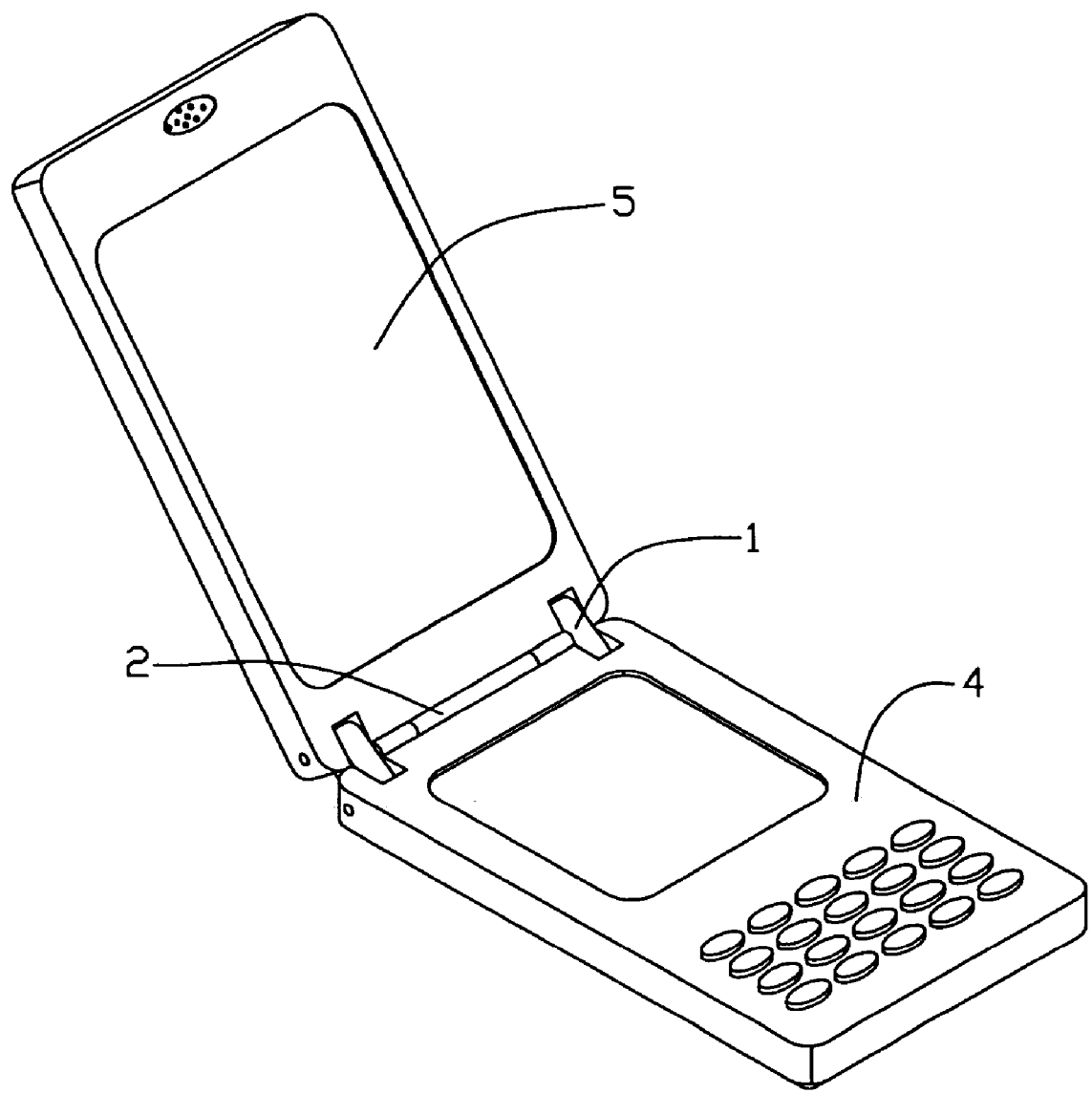
FIG. 3 is an isometric view of the foldable radiotelephone of FIG. 2 fully assembled, and showing a cover of the foldable radiotelephone in a partly open position.

Referring now to the drawings in detail, FIGS. 1 to 3 show a hinge mechanism for joining a first component of a foldable electronic device like a main housing 4 of a foldable radiotelephone (not labeled) to a second component of the foldable electronic device like a cover 5 of the foldable radiotelephone.

Figure 7:
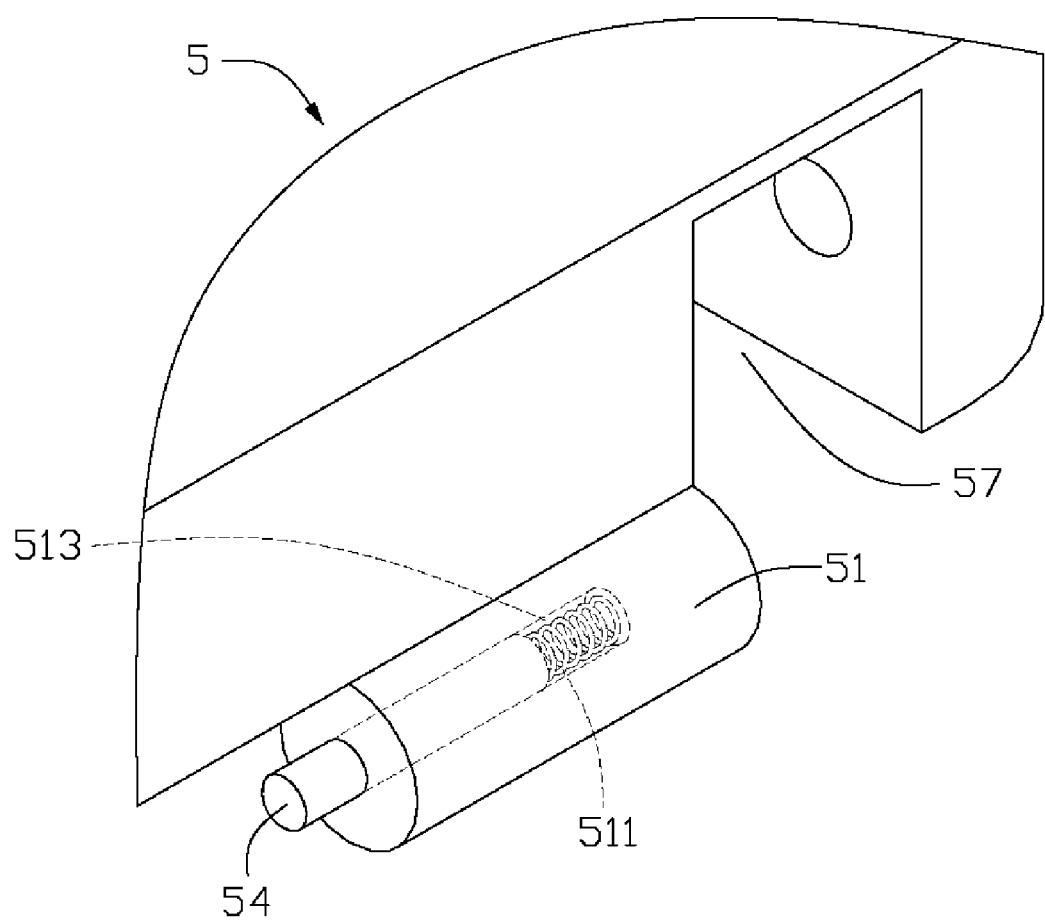
FIG. 7 is an enlarged view of a portion of a cover of the foldable radiotelephone of FIG. 2, showing parts of a second spindle of the hinge assembly, details of such parts being shown by broken lines.

Referring to FIG. 2, the main housing 4 and the cover 5 each have a first end and a second end, with the first ends of the main housing 4 and the cover 5 being connected together. A single connecting assembly 2 is located on both the main housing 4 and the cover 5. Also referring to FIG. 7, the connecting assembly 2 comprises a first spindle 41, two second spindles 51, two blocks 54, and two press springs 511 installed in the second spindles 51 respectively. The first spindle 41 and the second spindles 51 are respectively formed at the first ends of the main housing 4 and the cover 5. A central axial through hole (not labeled) is defined in the first spindle 41. A central axial hole 513 is defined in each second spindle 51, for containing the corresponding press spring 511. One end of the press spring 511 is fixed to the corresponding block 54. The press springs 511 are used to press the blocks 54 to project into the through hole of the first spindle 41. Two first sockets 43 and two grooves 44 are defined at the first end of the main housing 4. Two holes 47 are defined in two opposite sidewalls respectively of each first socket 43. Two second sockets 53 are defined at the first end of the cover 5. The second spindles 51 are formed on the first end of the cover 5 adjacent the second sockets 53 respectively. Two holes 57 are defined in two opposite sidewalls respectively of each second socket 53. Each block 54 protrudes from an inner end of its corresponding second spindle 51, under force of the press spring 511 within the second spindle 51. The blocks 54 are aligned along a pivot axis of the foldable radiotelephone, and face each other.

The hinge mechanism comprises two rotation assemblies 1 and the connecting assembly 2. Referring to FIG. 1, each rotation assembly 1 comprises a spring 11, two fixed shafts 12, and two spring casings 13. The spring 11 is a coil spring with a hook 111 at each end thereof. Each spring casing 13 is generally boat-shaped. Each spring casing 13 has a connecting surface 132 interfacing with the connecting surface 132 of the other spring casing 13. A spring hollow 133 is defined in the spring casing 13. Two pairs of transverse slots 131 are defined in sidewalls of the spring casing 13, each pair of slots 131 being near a respective end of the spring casing 13. Each slot 131 is shallow, such that the sidewall at the base of the slot 131 can function as a kind of runner for a corresponding fixed shaft 12. The spring 11 is mounted in a cavity that is cooperatively formed by the spring hollows 133 of the two spring casings 13. Each fixed shaft 12 is received in a corresponding pair of slots 131 of both spring casings 13.

In pre-assembly of each rotation assembly 1, the spring 11 is inserted into the spring hollow 133 of one spring casing 13. The other spring casing 13 is put onto the first spring casing 13 at the connecting surfaces 132 thereof, and the two spring casings 13 are adhered together to form a spring casing assembly. Two spring casing assemblies are thus formed.

Then the press springs 511 are inserted into the holes 513 of the second spindles 51. The blocks 54 are buckled into opposite ends of the through hole of the first spindle 41. The second spindles 51 are thus located in the grooves 44. Next, one of the spring casing assemblies is inserted into one of the first sockets 43 and the corresponding second socket 53. One of the fixed shafts 12 is inserted through the two corresponding holes 47 and a corresponding one of the two hooks 111. The other fixed shaft 12 is inserted through the two corresponding holes 57 and the other corresponding hook 111. The fixed shafts 12 are thereby held in the main housing 4 and cover 5. The other spring casing assembly is attached to the main housing 4 and cover 5 in the same manner as described above. Thus the main housing 4 and the cover 5 are pivotably connected together.

Figure 4:
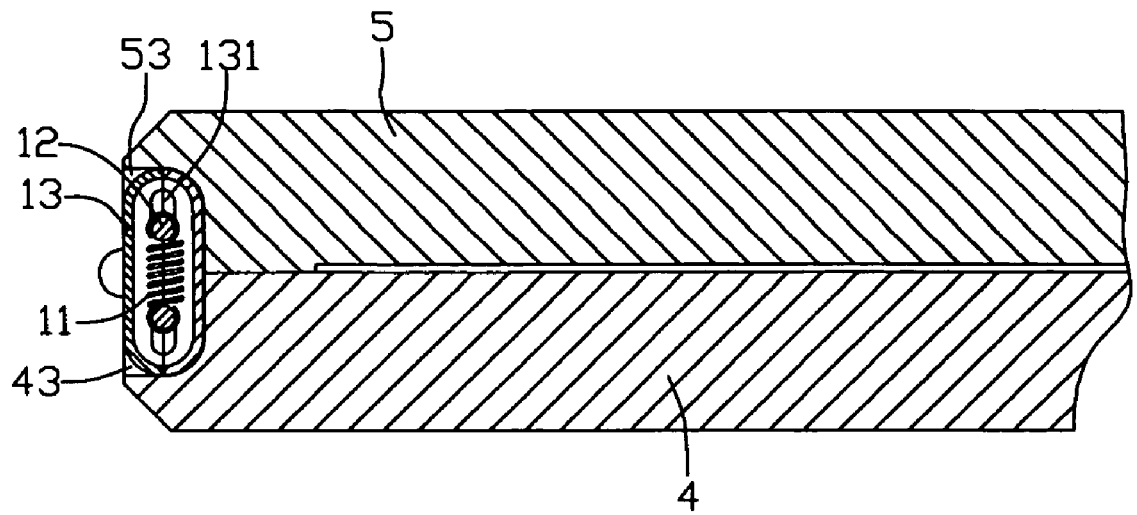
FIG. 4 is an enlarged, cut-away side view of part of the foldable radiotelephone of FIG. 3, but showing the foldable radiotelephone in a closed position and the hinge mechanism in a first state.
Figure 5:
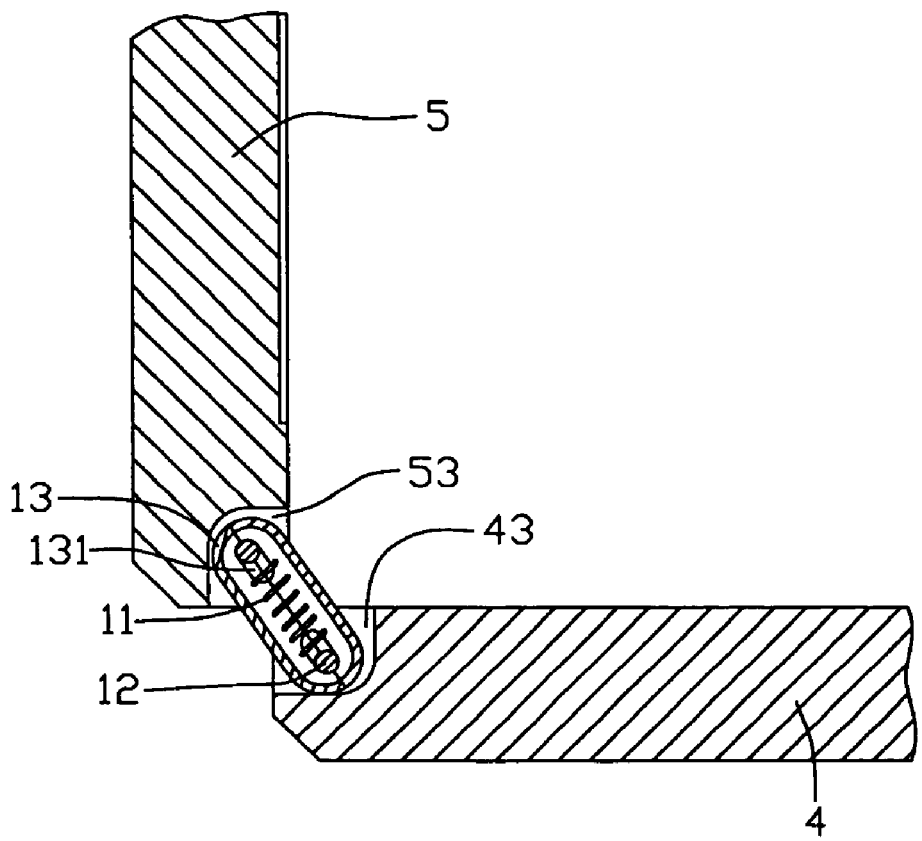
FIG. 5 is similar to FIG. 4, but showing the foldable radiotelephone in a half open position and the hinge mechanism in a second state.
Figure 6:
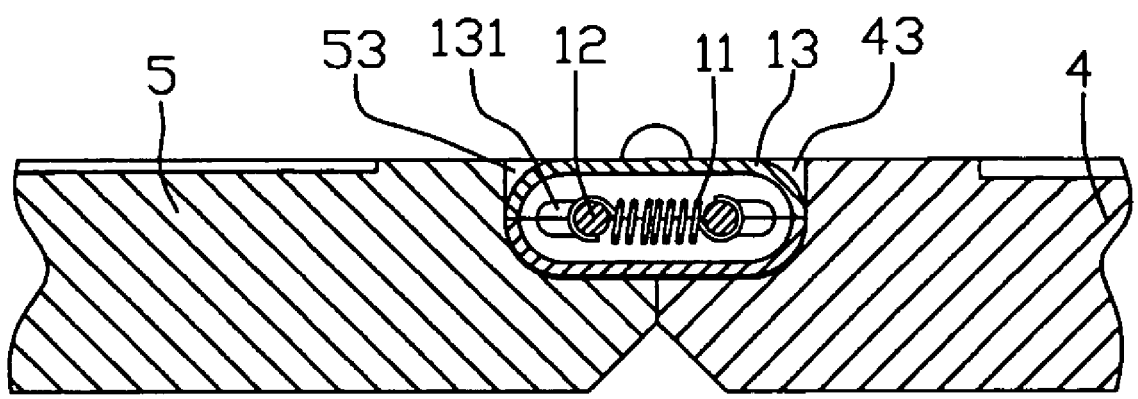
FIG. 6 is similar to FIG. 5, but showing the foldable radiotelephone in a fully open position and the hinge mechanism in a third state.

Referring to FIGS. 4 to 6, in use of the hinge mechanism of the foldable radiotelephone, in a starting position, the cover 5 is closed. As shown in FIG. 4, all the fixed shafts 12 are located at respective inmost ends of the runners of the slots 131, and the springs 11 are in a relaxed state and have a normal length. To open the foldable radiotelephone, the cover 5 is manually rotated up relative to the main housing 4 about the pivot axis. The rotation assemblies 1 pivot about the shafts 12 connected to the main housing 4. Top ends of the rotation assemblies 1 adjacent to the cover 5 move away from the main housing 4. Therefore, the springs 11 are stretched and acquire elastic potential energy. Referring to FIG. 5, once the angle between the main housing 4 and the cover 5 is 90°, all the fixed shafts 12 are located at respective outmost ends of the runners of the slots 131, and the springs 11 have reached their maximum lengths and elastic potential energy. When the angle is increased beyond 90°, the cover 5 continues to open automatically due to the elastic rebounding of the springs 11. As shown in FIG. 6, once the cover 5 has reached a fully open position, all the fixed shafts 12 are again located at the respective inmost ends of the runners of the slots 131, and the springs 11 are returned to their relaxed states and normal lengths. The process of closing the cover 5 is substantially the reverse of the above-described opening process.

The number of rotation assemblies 1 applied in the foldable radiotelephone is not limited to two. For example, one or three rotation assemblies 1 may instead be employed. In other embodiments, the spring casings 13 can be other than boat-shaped, and can even be omitted altogether.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. A hinge mechanism for pivotably joining a cover to a main housing of a foldable radiotelephone, comprising:
   a rotation assembly comprising a hollow connecting member, two shafts adapted to pivotably connect opposite ends of the connecting member with the cover and the main housing, and an elastic member received in the connecting member, opposite ends of the elastic member being engaged with the shafts respectively; and
   a connecting assembly adapted to pivotably join the cover and the main housing of the foldable radiotelephone, the connecting assembly comprising a first spindle and two second spindles, the first spindle and the second spindles provided on corresponding ends of the main housing and the cover respectively;
   wherein at least one of the shafts is slidable along a longitudinal axis of the connecting member; and
   when the cover is opened relative to the main housing, the at least one shaft slides along the longitudinal axis in a first direction and stretches the elastic member; and when the cover reaches a predetermined angle relative to the main housing, the elastic member rebounds and drives the at least one shaft to slide along the longitudinal axis in a second direction opposite to the first direction, whereby the cover is automatically further opened relative to the main housing.

2. The hinge mechanism as claimed in claim 1, wherein the elastic member is a spring, and each of the opposite ends of the spring has a hook.

3. The hinge mechanism as claimed in claim 1, wherein the connecting member is formed by two boat-shaped casings attached together, each casing defines one pair of cutouts, and the shafts are received in holes cooperatively formed by the cutouts.

4. The hinge mechanism as claimed in claim 3, wherein the connecting member defines a hollow therein for receiving the elastic member.

5. The hinge mechanism as claimed in claim 1, wherein the connecting assembly further comprises two blocks, the first spindle defines a central axial through hole, each second spindle defines a central axial hole, part of each block is held in the axial hole of a corresponding one of the second spindles, and another part of each block extends into the axial through hole of the first spindle.

6. A foldable electronic device, comprising:
   a main housing having a first socket in one end thereof;

a cover having a second socket in one end thereof corresponding to the first socket; and a hinge mechanism interconnecting the cover and the main housing, the hinge mechanism comprising a rotation assembly, the rotation assembly comprising a hollow connecting member, two shafts pivotably connecting opposite ends of the connecting member with the cover and the main housing at the second and first sockets respectively, two opposite ends of one of the shafts protruding out of the connecting member and engaging with two opposite sidewalls of the first socket of the main housing, two opposite ends of the other shaft protruding out of the connecting member and engaging with two opposite sidewalls of the second socket of the cover, and an elastic member received in the connecting member, opposite ends of the elastic member being engaged with the shafts respectively;

wherein at least one of the shafts is slidable along a longitudinal axis of the connecting member; and when the cover is opened relative to the main housing, the at least one shaft slides along the longitudinal axis in a first direction and stretches the elastic member; and when the cover reaches a predetermined angle relative to the main housing, the elastic member rebounds and drives the at least one shaft to slide along the longitudinal axis in a second direction opposite to the first direction, whereby the cover is automatically further opened relative to the main housing.

7. The foldable electronic device as claimed in claim 6, wherein the hinge mechanism further comprises a connecting assembly adapted to pivotably join the cover and the main housing together.

8. The foldable electronic device as claimed in claim 7, wherein the connecting assembly comprises a first spindle and two second spindles, and the first spindle and the second spindles are provided on corresponding ends of the main housing and the cover respectively.

9. The foldable electronic device as claimed in claim 8, wherein the connecting assembly further comprises two blocks, the first spindle defines a central axial through hole, each second spindle defines a central axial hole, part of each block is held in the axial hole of a corresponding one of the second spindles, and another part of each block extends into the axial through hole of the first spindle.

10. The foldable electronic device as claimed in claim 9, wherein each of two opposite sidewalls of the first socket defines a hole, and each of two opposite sidewalls of the second socket defines a hole, opposite ends of one of the shafts are received in the holes of the first socket, and opposite ends of the other shaft are received in the holes of the second socket.

11. The foldable electronic device as claimed in claim 6, wherein the elastic member is a spring, and each of the opposite ends of the spring has a hook.

12. The foldable electronic device as claimed in claim 11, wherein the connecting member defines a hollow therein for receiving the spring.

13. The foldable electronic device as claimed in claim 6, wherein the connecting member is formed by two boat-shaped casings attached together, each casing defines one pair of cutouts, and the shafts are received in holes cooperatively formed by the cutouts.

14. A foldable electronic device, comprising:

a first component enclosing parts of said foldable electronic device, the first component having two opposite sidewalls cooperatively defining a socket therebetween;

a second component enclosing other parts of said foldable electronic device and disposed next to said first component, said second component having two opposite sidewalls cooperatively defining a socket therebetween, and said second component movable relative to said first component between a first position where said first and second components are placed side by side with a side of said first component covered by said second component, and a second position where said second component is moved away from said first position to expose said side of said first component; and a hinge mechanism disposed between said first and second components to guide movement of said second component relative to said first component, said hinge mechanism comprising at least two shafts respectively engaging with said first and second components and movable together therewith and an elastic member connecting said at least two shafts, one end of said elastic member disposed between two ends of a first one of said at least two shafts and an opposite end of said elastic member disposed between two ends of a second one of said at least two shafts, two opposite ends of said first one of said at least two shafts engaging with the sidewalls of said first component, two opposite ends of said second one of said at least two shafts engaging with the sidewalls of said second component, said second one of said at least two shafts engaged with said second component staying at a location away from said first one of said at least two shafts engaged with said first component when said second component locates in said first position thereof, and movable away from said location versus a restraining force of said elastic member when said second component moves from said first position thereof toward said second position thereof.

15. The foldable electronic device as claimed in claim 14, wherein said elastic member is a helical spring, and said second one of said at least two shafts engaged with said second component is restrained by the spring from moving away from said location thereof.

16. The foldable electronic device as claimed in claim 14, wherein said location of said second one of said at least two shafts engaged with said second component is spaced from said first one of said at least two shafts engaged with said first component a predetermined distance.

* * * * *